June 22, 1954    T. F. HOLMBERG    2,681,855
PROCESS FOR CHLORINATING ORES
Filed June 4, 1951
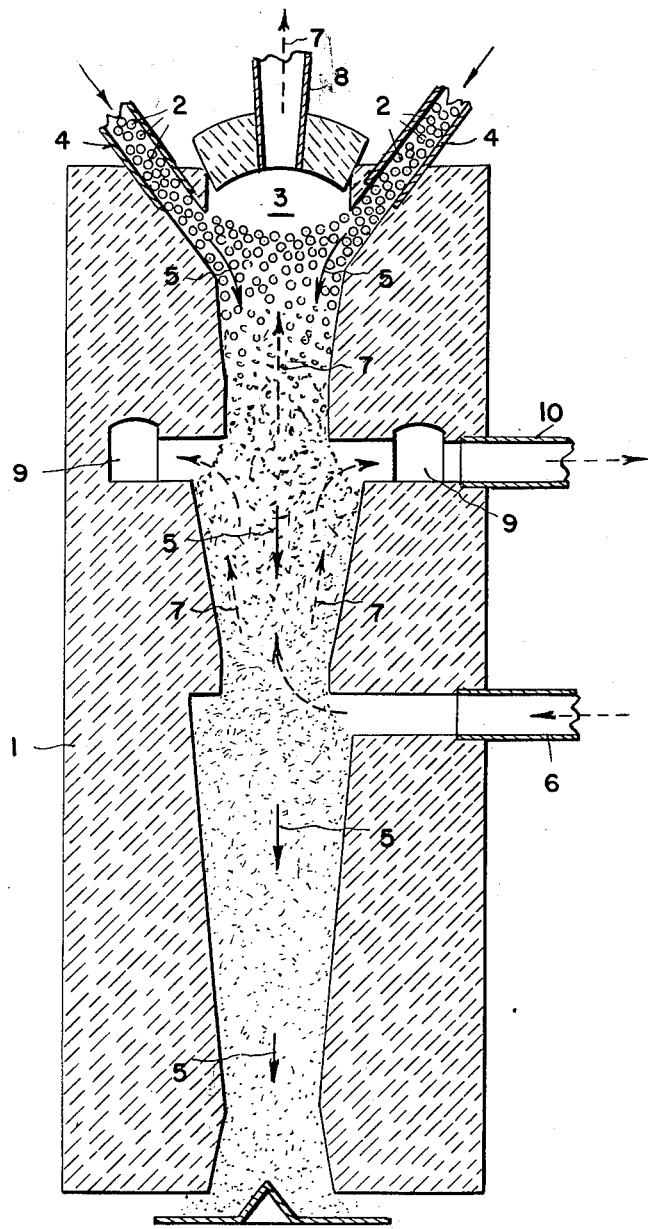
INVENTOR
TOR F. HOLMBERG
BY Wenderoth, Lind and Ponack
ATTORNEYS Patented June 22, 1954

2,681,855

UNITED STATES PATENT OFFICE 2,681,855

PROCESS FOR CHLORINATING ORES

Tor Fjalar Holmberg, Imatra, Finland, assignor to Osakeyhtio Vuoksenniska Aktiebolag, Imatra, Finland, a joint-stock company Application June 4, 1951, Serial No. 229,697

3 Claims. (Cl. 75—113)

The present invention relates to a method of purifying ores by chlorination.

As known especially iron ores often comprise other metals such as zinc, nickel, copper and cobalt, which render the iron impure and cause troubles in the blast-furnaces during the following recovering process.

It has been proposed to purify iron ores by mixing the ore with chlorides such as calcium chloride, and then to convert the mixture into lumps or briquettes in which form it is heated in a suitable reaction furnace.

The advantages aimed at with the briquetting of the mixture are that the material treated in the reaction furnace should maintain its lump form and thereby be easier to handle in later processes.

Said method has, however, met considerable difficulties and could not be performed in large scale in practice. The lumps consisting of the mixture of chlorinating agent and ore melt and flow into one another at the high temperature of 1100°–1300° C., which is necessary for the reaction process. The ore did consequently not maintain its lump form in the known processes.

The reason why the lumps did flow into one another is that the chlorinating salt as long as it contains water of crystallization has a very low melting point. In order to remove this water of crystallization large gas quantities should be used so that the relative humidity of the gas as well as the temperature may be kept low. But this is not favourable for the reacting process.

Another disadvantage observed at attempts to carry out the earlier proposed method in larger furnaces, such as a shaft furnace, is that the heated gas used for heating the ore lumps becomes cooled down so much that the gas containing volatilised metal chlorides is inclined partially to condensate, whereby the chloride is deposited on the ore and is difficult to remove later.

In order to obtain favourable chlorination and a good heating economy one tries to avoid too large gas quantities. Usually the employed gas quantity calculated in cubic meter corresponds to the amount of ore in kilogram.

In a shaft furnace the cold lumps consisting of a mixture of ores and chlorinating agent are introduced at the top of the furnace and move down towards the furnace bottom.

The heating gas is introduced at high temperature into the lower part of the furnace and ascend through it, whereby the gas becomes cooled by the material. The gas is withdrawn at the top of the furnace. In this part of the furnace where the gas comprising volatilised metal chlorides meets the entering cool lumps, the cooled gas will partly condensate whereby the chlorides deposit on said entering cool lumps.

The present invention now eliminates the drawbacks described above.

According to the invention the mixture of ores and a chlorinating salt is bullet moulded preferably to balls with a diameter about 25 mm. and preheated in a separate furnace at a temperature of 200°–300° C., whereby simultaneously a sufficient amount of gas is blown through the furnace so that the surplus of water as well as water of crystallisation is removed. Only thereafter the lumps are introduced into the reducing atmosphere furnace.

Now the bullet moulded lumps endure the high temperature in the reaction furnace and will maintain their lump form without flowing into one another during the chlorination.

A second feature of the method according to the present invention is that the heating gas, which is introduced at the lower part of the furnace at a temperature of about 1100°–1300° C., and brought to ascend in the furnace against the movement of the lumps is partially withdrawn from the furnace before it reaches the top of the furnace, i. e. before it becomes cooled down to the leaving temperature of 200°–500° C.

Preferably 25 per cent of the gas is removed when its temperature has reached 700°–800° C. At this temperature the gas comprises a high percentage of metal chlorides, and by removing it before the gas is cooled down to condensation temperature the risk of condensation of the chlorides in the cold part of the furnace is effectively counteracted.

The enclosed drawing shows diagrammatically the vertical section of a device for the performance of the method according to the last mentioned feature of the present invention.

The reaction furnace is a shaft furnace 1. The mixture of ore and chlorinating agent is introduced in bullet moulded lumps 2 at the top 3 of the furnace through inlets 4, and move during the chlorinating process towards the bottom of the furnace as shown by the arrows 5.

A heating gas is introduced at 6 into the furnace at a temperature of 1100°–1300° C. This gas ascends in the furnace against the movement of the ore as shown by the arrows 7 and is removed from the top of the furnace at the point 8 and at a temperature of 200°–500° C.

At 9 a part of the gas, preferably 25 per cent is removed through the channels 10 at a temperature of 700°–800° C. The rest of the gas continues towards the top of the furnace.

What I claim and desire to secure by Letters Patent is:

1. A method of purifying iron containing ores by chlorination to remove impurities in the form of the volatile chlorides formed, comprising essentially, forming an intimate mixture of said ore with calcium chloride containing water of crystallization as the chlorinating salt, forming said mixture into lumps, preheating said lumps at a temperature of about 200° C. to about 300° C. in a separate furnace and at the same time blowing through said furnace a gas to sweep and thereby remove water in the ore, water of crystallization and occluded gases from said lumps and thereafter heating said lumps in a second chlorination furnace with a hot gas at a temperature of about 1100° C. to about 1300° C. to thereby generate chlorine and chlorinate said ore, said hot gas introduced in the lower part of said furnace to flow countercurrent to said lumps which are introduced at the top of said furnace, the furnace temperature at the bottom being between about 1100° C. to about 1300° C., the temperature at the top of the furnace being about 200° C. to about 500° C. and at an intermediate zone between the top and bottom of the furnace the temperature being between about 700° C. and about 800° C. and removing a portion of said hot gas containing a relatively high content of volatilized chloride at said intermediate zone whereby the condensation of the volatile chlorides in the cooler portions of said second furnace is reduced and the removal of volatile chlorides is increased.

2. A method as in claim 1 wherein about 25% of said heating gases are removed at said intermediate zone of said second furnace.

3. In a method of purifying iron containing ores by chlorination to remove impurities in the form of the volatile chlorides formed, forming lumps of an intimate mixture of said ore with calcium chloride, said lumps separately preheated between about 200°–300° C. and swept with gas to remove water and occluded gas volatile at this temperature and heating said formed preheated lumps in a chlorinating furnace with a hot gas introduced at a point near the bottom of said furnace at a temperature of between about 1100° C. and about 1300° C., said hot gas flowing countercurrent to said lumps which are introduced at the top of said furnace, the temperatures of said furnace being between about 1100° C. to about 1300° C. at the bottom, between about 200° C. and about 500° C. at the top and between about 700° C. to about 800° C. at a point intermediate between the top and the bottom, and removing a portion of the gas from said furnace at said intermediate point, said portion containing a relatively high content of volatilized chlorides whereby condensation of said volatilized chlorides on the heated lumps is substantially reduced, the lump form is maintained and the higher amount of volatile chlorides are removed.

References Cited in the file of this patent

UNITED STATES PATENTS

| Number | Name | Date |
|---|---|---|
| 1,170,375 | Wedge | Feb. 1, 1916 |
| 1,192,037 | Clawson | July 25, 1916 |
| 1,496,879 | Hirt | June 10, 1924 |
| 1,507,858 | Schmidt et al. | Sept. 9, 1924 |
| 1,518,376 | Vermaes et al. | Dec. 9, 1924 |
| 1,545,359 | Simon | July 7, 1925 |
| 1,593,022 | Knight | July 20, 1926 |
| 1,931,944 | Wood et al. | Oct. 24, 1933 |
| 2,030,867 | Hart | Feb. 18, 1936 |

OTHER REFERENCES

Liddell, D. M., "Handbook of Nonferrous Metallurgy," 2nd ed., McGraw-Hill, New York, N. Y., vol. 2, page 544.